United States Patent [19]

Brander

[11] 4,401,925

[45] Aug. 30, 1983

[54] MEANS OF ENERGIZING VIBRATING FEEDERS

[75] Inventor: James E. Brander, Baulkham Hills, Australia

[73] Assignee: International Comustion Australia Limited, Rydalmere, Australia

[21] Appl. No.: 119,696

[22] Filed: Feb. 8, 1980

Related U.S. Application Data

[63] Continuation-in-part of Ser. No. 96,604, Nov. 21, 1979, abandoned.

[30] Foreign Application Priority Data

Nov. 24, 1978 [AU] Australia .............................. PD6904

[51] Int. Cl.³ ............................................ H02K 33/00
[52] U.S. Cl. .................................... 318/114; 318/128; 318/129
[58] Field of Search ............... 318/128, 114, 341, 129, 318/809, 812

[56] References Cited

U.S. PATENT DOCUMENTS

| | | | |
|---|---|---|---|
| 3,307,094 | 2/1967 | Ogle | 318/341 |
| 3,355,633 | 11/1967 | Klix | 318/114 X |
| 3,546,554 | 12/1970 | Kato | 318/341 |
| 3,621,351 | 11/1971 | Goto et al. | 318/812 |
| 3,908,158 | 9/1975 | Studtman | 318/809 |
| 4,070,605 | 1/1978 | Hoeppner | 318/809 X |

*Primary Examiner*—B. Dobeck
*Attorney, Agent, or Firm*—Ladas & Parry

[57] ABSTRACT

A method of, and apparatus for, energizing electromagnetic vibrators. An electromagnetic vibrator, driven by an electromagnet, is energized directly from an electric mains supply line carrying alternating current at a particular frequency. The electromagnet is operated at a fraction greater than one-quarter, and preferably equal to two-thirds or two-fifths, of the supply frequency such that the current drawn from the mains supply is substantially alternating current.

11 Claims, 4 Drawing Figures

MEANS OF ENERGIZING VIBRATING FEEDERS

This application is a continuation-in-part of my co-pending application Ser. No. 096,604 filed Nov. 21, 1979 (now abandoned).

This invention relates to a method of, and apparatus for, energising electromagnetic vibrating feeders. A method is used whereby the energisation of the feeder is directly from an electric supply line carrying alternating current. The electromagnet in the vibrating feeder is supplied alternating current of a lower frequency than the alternating current in the supply line.

Vibratory motors of both the electromechanical and electromagnetic type are used to provide the motive force for vibratory equipment used in materials handling and related fields. Each has its own advantages and disadvantages. The present invention is concerned only with vibratory motors of the electromagnetic type. These have in the past been driven by an electromagnet with an air gap. Part of the electromagnet is usually in the shape of an 'E' and is fitted with electrical coil or coils, and the other part of the magnetic circuit is in the shape of an 'I' fitted to the other part of the machine with an air gap between them, so that the two may vibrate relative to one another with a consequent oscillatory increase and decrease in the size of the air gap.

Examples of vibratory conveyors and feeders using electromagnetic vibratory motors are shown in Australian Patent Specification Nos. 140193, 204274 and 245317, and in U.S. Pat. Nos. 2,163,249, 2,654,466 and 2,694,156.

Many variations to the basic arrangement described above using magnetic circuits made up of 'E' and 'I' parts are known, some employing permanent magnets to permit operation with full wave alternating current by use of rectifiers. Almost all of these machines run at the frequency of the electricity supply, in general either at 50 or 60 Hz.

In recent years it has been determined that the machines which draw half wave alternating current using rectifiers severely influence the electrical supply to which they are connected. Even the machines employing permanent magnets to permit operation with full wave alternating current still draw direct current from the supply as the load on the machine acts in one direction only. This means that the current drawn on one half cycle is not balanced by the current drawn on the next half cycle, necessitating direct current to be drawn from the supply to maintain a balance.

Some attempt has been made to run these machines at a lower frequency, usually half of the supply frequency, i.e. 25 Hz for a 50 Hz supply and 30 Hz for a 60 Hz supply. This, however, does not remedy the problem of the large D.C. component drawn from the supply and in fact makes it considerably worse. Other machines run at 100 or 120 Hz, but these machines are very limited in size and have a poor rate of feeding compared to machines which operate at 50 or 60 Hz.

It is an object of the present invention to provide an improved method of energising electromagnetic vibrators.

It is a further object of the present invention to provide apparatus for energising the electromagnetic vibrators according to the improved method.

Accordingly the present invention in one broad form provides a method of energising an electromagnetic vibrator driven by an electromagnet, said method comprising supplying said electromagnetic vibrator with an alternating voltage supply at a predetermined frequency and operating said electromagnet at a frequency which is a fraction of said predetermined frequency, said fraction being an odd fraction greater than one-quarter, whereby the current drawn from said alternating voltage supply by said electromagnetic vibrator is substantially alternating current.

The invention in a further broad form provides apparatus for energising an electromagnetic vibrator driven by an electromagnet, said apparatus comprising electric circuit means adapted to be supplied with alternating voltage at a predetermined frequency, said electric circuit means comprising in series connection a coil for energising said electromagnet, and switching means, said switching means being adapted for triggering at a rate which is a fraction of said predetermined frequency, said fraction being an odd fraction greater than one-quarter.

An "odd fraction" is one in which the denominator is odd.

An embodiment of the present invention will now be described with reference to the drawings in which.

Figure 1:
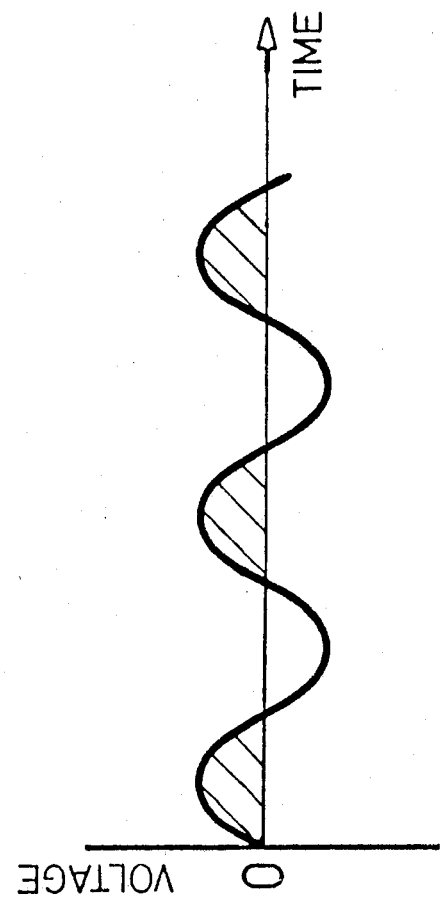
FIG. 1 shows the variation with time of the supply voltage and the power drawn from the supply for a prior art machine.

Referring to FIG. 1, the shaded half-cycles indicate those points at which power is drawn from the supply for a prior art machine vibrating at the supply frequency which would usually be 50 Hz or 60 Hz. It can be seen that there is a significant d.c. component in the current drawn from the supply.

Figure 2:
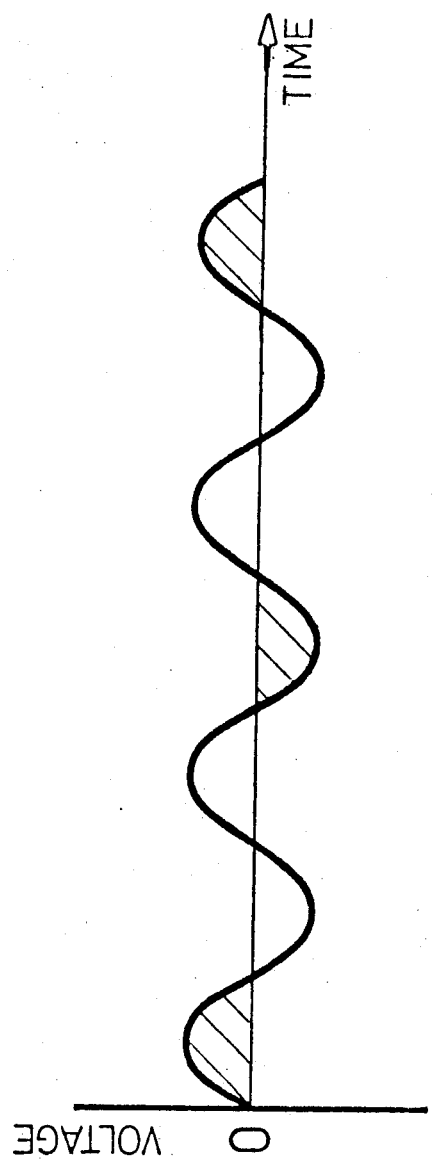
FIG. 2 shows the variation with time of the supply voltage and the power drawn from the supply for an embodiment of the present invention.

In FIG. 2, the shaded half cycles indicate those points at which power is drawn from the supply for a machine vibrating at two-thirds of the supply frequency. Thus, the frequency of vibration is 33.⅓ Hz for a 50 Hz supply and 40 Hz for a 60 Hz supply.

Figure 3:
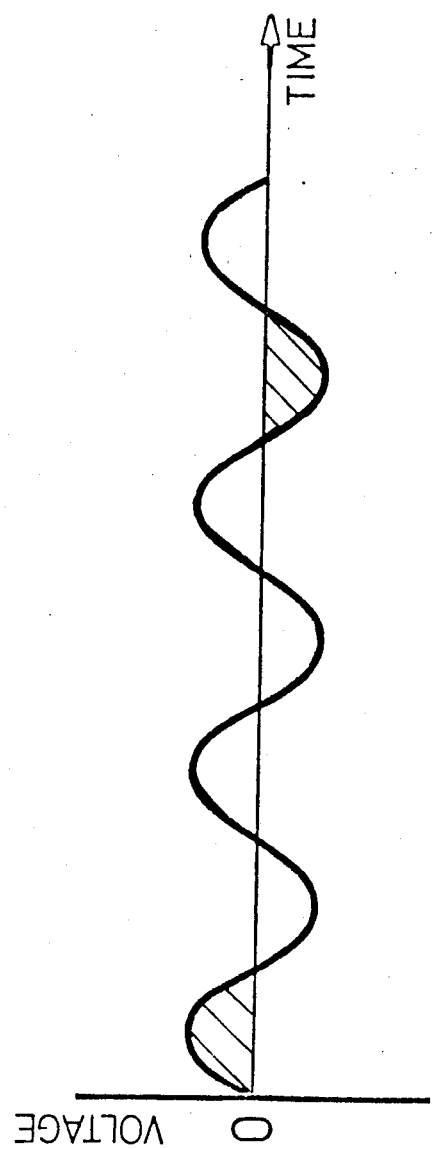
FIG. 3 shows the variation with time of the supply voltage and the power drawn from the supply for another embodiment of the present invention.

In FIG. 3, the shaded half cycles indicate those points at which power is drawn from the supply for a machine vibrating at two-fifths of the supply frequency. Thus the frequency of vibration is 20 Hz for a 50 Hz supply and 24 Hz for a 60 Hz supply.

It will be noted in the case of FIGS. 2 and 3 that the voltage applied to the electromagnet in the vibrating machines is alternating in polarity although at a lower frequency than the supply frequency. This alternation of polarity has an important benefit in that the iron of the electromagnet is magnetically energised first in one direction and then in the other. A severe disadvantage of electromagnets which are only energised in one direction is that the magnet iron is not effectively used and is easily saturated.

It will also be noted in FIGS. 2 and 3 that the current drawn from the supply is substantially a.c.

Figure 4:
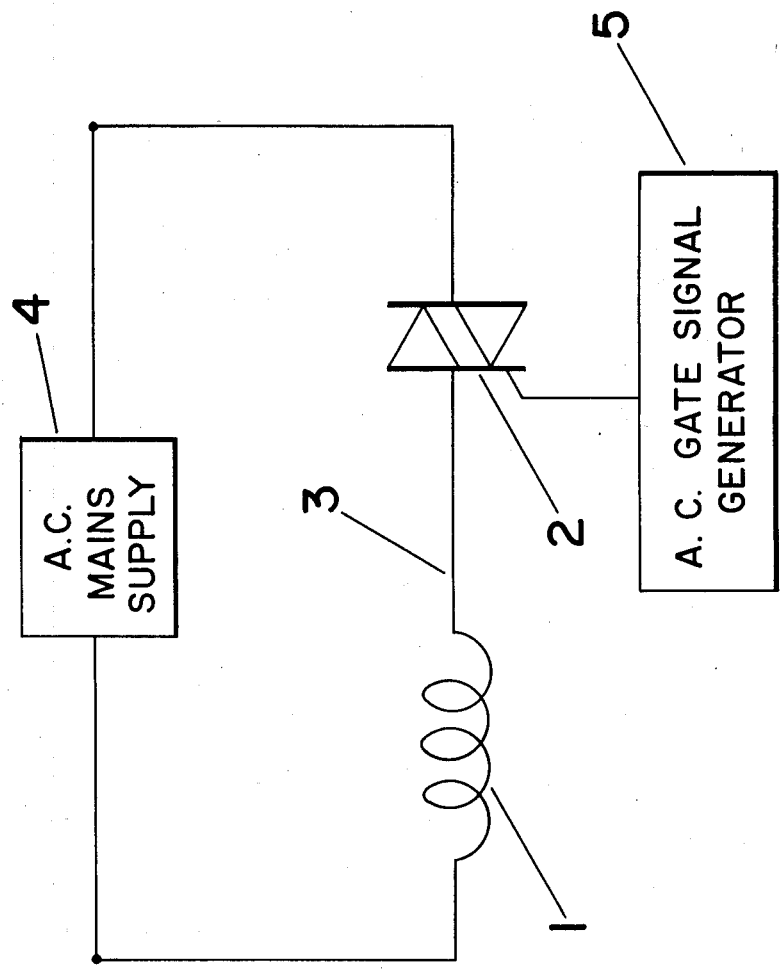
FIG. 4 shows an electric power circuit for an electromagnetic vibrator according to another embodiment of the present invention.

Turning to FIG. 4, the electric circuit is supplied with alternating voltage from an A.C. mains supply 4. The frequency of the voltage supply is usually 50 Hz, but can be 60 Hz in some instances. The circuit comprises a coil 1 which is used to energise the electromagnet of the vibrator. Coil 1 is series connected to a TRIAC 2 which is a special type of thyristor which permits current to flow in both directions when triggered by an A.C. gate signal generator 5 connected thereto.

In one preferred embodiment, the TRIAC is triggered at a frequency equal to $\frac{2}{3}$ of the supply frequency. Thus, for a 50 Hz supply, the TRIAC is triggered at 33.$\frac{1}{3}$ Hz, and for a 60 Hz supply, the TRIAC triggering rate is 40 Hz.

In another preferred embodiment where acoustic noise is more important than electromagnet power, the TRIAC is triggered at a frequency equal to two-fifths of the supply frequency. Thus for a 50 Hz supply, the TRIAC is triggered at 20 Hz and for a 60 Hz supply, the TRIAC triggering rate is 24 Hz. Preferably, TRIAC 2 conducts current for half a period of the supply frequency each time it is triggered.

It is not essential to the invention that a TRIAC be used. The TRIAC can be replaced by a pair of silicon controlled rectifiers connected in inverse parallel, although use of a TRIAC results in a simpler and more reliable control.

A further benefit of the operation of a vibrating feeder at two-thirds of its supply frequency is that many bulk materials having fine grains do not respond well to being vibrated at 50 Hz. A machine running at a lower frequency can operate with a much larger vibrating stroke and bulk materials having fine grains respond much more rapidly to such vibration.

What I claim is:

1. In a method of energizing an electromagnetic vibrator of the kind having an electromagnet for driving the vibrator, switching means in series with the coil of said electromagnet, and means for connecting the serially-connected switching means and coil across an alternating current power supply, the improvement comprising operating the switching means at a rate which is an odd fraction, greater than one-quarter, of the alternating current frequency of said power supply so as to cause each successive energization of said electromagnet to be in an alternate direction and exist for at least one half period of the alternating current frequency of said power supply.

2. A method as claimed in claim 1 wherein said odd fraction is approximately two-thirds.

3. A method as claimed in claim 1 wherein said odd fraction is approximately two-fifths.

4. A method as claimed in claim 1, 2 or 3, wherein said electromagnetic vibrator is adapted for use in an electromagnetic vibrating feeder.

5. In an electromagnetic vibrator comprising an electromagnetic for driving the vibrator, switching means in series with the coil of said electromagnetic, and means for connecting the serially-connected switching means and coil across an alternating current power supply, the improvement wherein means are provided for operating the switching means at a rate which is an odd fraction, greater than one-quarter, of the alternating current frequency of said power supply so as to cause each successive energization of said electromagnet to be in an alternate direction and exist for at least one half period of the alternating current frequency of said power supply.

6. An electromagnetic vibrator as claimed in claim 5, wherein said odd fraction is approximately two-thirds.

7. An electromagnetic vibrator as claimed in claim 5, wherein said odd fraction is approximately two-fifths.

8. An electromagnetic vibrator as claimed in claim 5, 6 or 7, wherein said switching means comprises a bidirectional triggerable switching device.

9. An electromagnetic vibrator as claimed in claim 8 wherein said bidirectional triggerable switching device comprises a TRIAC.

10. An electromagnetic vibrator as claimed in claim 8 wherein said bidirectional triggerable switching device comprises two silicon controlled rectifiers connected in inverse parallel relationship.

11. An electromagnetic vibrates as claimed in claim 5 wherein said electromagnetic vibrator is adapted for use in an electromagnetic vibrating feeder.

* * * * *